United States Patent
Anand et al.

(10) Patent No.: US 9,009,189 B2
(45) Date of Patent: Apr. 14, 2015

(54) MANAGING AND IMPROVING QUESTION AND ANSWER RESOURCES AND CHANNELS

(71) Applicant: International Business Machines Corporation, Armonk, NY (US)

(72) Inventors: Rangachari Anand, Teaneck, NJ (US); Rose Catherine Kanjirathinkal, Bangalore (IN); Juhnyoung Lee, Yorktown Heights, NY (US); Debapriyo Majumdar, Bangalore (IN); Karthik Visweswariah, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 71 days.

(21) Appl. No.: 13/755,396

(22) Filed: Jan. 31, 2013

(65) Prior Publication Data

US 2014/0214884 A1    Jul. 31, 2014

(51) Int. Cl.
G06F 7/00    (2006.01)
G06F 17/30    (2006.01)
G06Q 10/00    (2012.01)

(52) U.S. Cl.
CPC .................................. *G06Q 10/00* (2013.01)

(58) Field of Classification Search
USPC .................. 707/722, 723, 758, 769
See application file for complete search history.

(56) References Cited

U.S. PATENT DOCUMENTS

| | | | |
|---|---|---|---|
| 2001/0032244 A1 | 10/2001 | Neustel | |
| 2002/0161786 A1* | 10/2002 | Mangan et al. | 707/200 |
| 2004/0044542 A1* | 3/2004 | Beniaminy et al. | 705/1 |
| 2004/0210443 A1* | 10/2004 | Kuhn et al. | 704/276 |
| 2009/0012926 A1 | 1/2009 | Ishikawa et al. | |
| 2010/0036784 A1 | 2/2010 | Mishne et al. | |
| 2010/0205549 A1* | 8/2010 | Chen et al. | 715/760 |
| 2011/0235797 A1* | 9/2011 | Huet et al. | 379/265.09 |
| 2012/0102405 A1* | 4/2012 | Zuckerman et al. | 715/733 |
| 2012/0284254 A1* | 11/2012 | Garg et al. | 707/717 |
| 2012/0331390 A1* | 12/2012 | Kanjirathinkal et al. | 715/738 |
| 2013/0018909 A1* | 1/2013 | Dicker et al. | 707/758 |
| 2013/0124554 A1* | 5/2013 | Linyard et al. | 707/769 |
| 2014/0046858 A1* | 2/2014 | Werner | 705/304 |
| 2014/0146051 A1* | 5/2014 | Johnston et al. | 345/440 |

FOREIGN PATENT DOCUMENTS

| | | |
|---|---|---|
| EP | 1343102 A2 | 9/2003 |
| WO | 0077689 A1 | 12/2000 |

OTHER PUBLICATIONS

Ignatova, Kateryna et al., "Generating High Quality Questions from Low Quality Questions," Ubiquitous Knowledge Processing Lab, Computer Science Department, Technische Universitat, Darmstadt, Germany, 2008, 3 pages. Copy can be found at http://www.ukp.tu-darmstadt.de/fileadmin/user_upload/Group_UKP/publikationen/2008/QG08_Ignatova.pdf as of Jan. 29, 2013.

(Continued)

*Primary Examiner* — Hares Jami

(74) *Attorney, Agent, or Firm* — Ference & Associates LLC

(57) ABSTRACT

Methods and arrangements for handling user queries. Submitted queries are accessed, and there are identified queries as being insufficiently addressed. A priority is estimated for the identified queries, and the identified queries are ordered based on the estimated priority. A priority-ordered list of queries is provided as output.

18 Claims, 3 Drawing Sheets

(56) References Cited

OTHER PUBLICATIONS

Motro, Amihai et al., "Not All Answers Are Equally Good: Estimating the Quality of Database Answers (1997)," CiteSeerX, Abstract only, 1997, 2 pages. Copy can be found at http://citeseerx.ist.psu.edu/viewdoc/summary?doi=10.1.1.41.6145 as of Jan. 29, 2013.

Agichtein, Eugene et al., "Finding High-Quality Content in Social Media," WSDM'08, Palo Alto, California, USA, Feb. 11-12, 2008, 11 pages, ACM Digital Library.

Jeon, Jiwoon et al., "Finding Similar Questions in Large Question and Answer Archives," CIKM'05, Bremen, Germany, Oct. 31-Nov. 5, 2005, pp. 84-90, ACM Digitial Library.

Jeon, Jiwoon et al., "Finding Semantically Similar Questions Based on Their Answers," SIGIR'05, Salvador, Brazil, Aug. 15-19, 2005, pp. 617-618, ACM Digital Library.

Majumdar, Debapriyo et al., "Privacy Protected Knowledge Management in Services with Emphasis on Quality Data," CIKM'11, Glasgow, Scotland, United Kingdom, Oct. 24-28, 2011, pp. 1889-1894, ACM Digital Library.

Harper, F. Maxwell et al., "Predictors of Answer Quality in Online Q&A Sites," CHI 2008 Proceedings, Exploring Web Content, Florence, Italy, Apr. 5-10, 2008, pp. 865-874, ACM Digital Library.

Carbonell, Jaime et al., The Use of MMR, Diversity-Based Reranking for Reordering Documents and Producing Summaries, SIGIR'98, Melbourne, Australia, Aug. 24-28, 1998, pp. 335-336, ACM Digital Library.

Joachims, Thorsten, "Optimizing Search Engines using Clickthrough Data," SIGKDD'02, Edmonton, Alberta, Canada, Jul. 23-26, 2002, 10 pages, ACM Digital Library.

* cited by examiner

MANAGING AND IMPROVING QUESTION AND ANSWER RESOURCES AND CHANNELS

BACKGROUND

Generally, social media, help desks, contact centers, self-help portals, etc., represent faces and channels for companies to interact with their customers. Social media and/or online discussion arrangements can be hosted by a given company or by a third party in such a capacity.

Generally, companies have directed their employees to answer potential customer or user concerns raised in such discussions. Particularly, in view of the widespread popularity of social media, prospective customers can often refer to these online discussions to decide on products, services, etc. Companies have thus recognized some importance in ensuring that questions and concerns so posted are addressed within some reasonable time.

Generally, many companies have customer care centers (e.g., contact centers and self-help portals) for directly addressing customer queries. It is often recognized as important to have a high "first call resolution" rate, wherein a question or query gets resolved to a customer's satisfaction solely in the first phone call (or first other session of contact such as online chat). Accordingly, companies and other concerns usually wish to avoid the need for second or further calls or contact sessions. Additionally, not only is this challenging in its own right, but it becomes all the more so if new questions are posed during the first call or contact session, especially if such questions are not already covered in the knowledge base that the agents refer to; capturing and taking action on such matters then adds another layer of urgency and importance to the first call or contact session.

BRIEF SUMMARY

In summary, one aspect of the invention provides a method of handling user queries, the method comprising: utilizing a processor to execute computer code configured to perform the steps of: accessing submitted queries; identifying which of the submitted queries are insufficiently addressed; estimating a priority for the identified queries; ordering the identified queries based on the estimated priority; and providing a priority-ordered list of queries as output.

Another aspect of the invention provides an apparatus for handling user queries, the apparatus comprising: at least one processor; and a computer readable storage medium having computer readable program code embodied therewith and executable by the at least one processor, the computer readable program code comprising: computer readable program code configured to access submitted queries; computer readable program code configured to identify which of the submitted queries are insufficiently addressed; computer readable program code configured to estimate a priority for the identified queries; computer readable program code configured to order the identified queries based on the estimated priority; and computer readable program code configured to provide a priority-ordered list of queries as output.

An additional aspect of the invention provides a computer program product for handling user queries, the computer program product comprising: a computer readable storage medium having computer readable program code embodied therewith, the computer readable program code comprising: computer readable program code configured to access submitted queries; computer readable program code configured to identify which of the submitted queries are insufficiently addressed; computer readable program code configured to estimate a priority for the identified queries; computer readable program code configured to order the identified queries based on the estimated priority; and computer readable program code configured to provide a priority-ordered list of queries as output.

A further aspect of the invention provides a method comprising: receiving a query; consulting a query database for an answer to the query; upon failing to find an answer to the query in the query database, determining whether a similar query exists in the query database; and if a similar query is determined to exist in the query database: via applying a quality threshold, determining a quality of an existing answer to the similar query; classifying the received query based on applying the quality threshold, wherein: the received query is classified as an unanswered query if the quality threshold is satisfied; the received query is classified as an unsatisfactorily answered query if the quality threshold is not satisfied; and thereupon prioritizing the received query for subsequent handling, relative to at least one other received query.

For a better understanding of exemplary embodiments of the invention, together with other and further features and advantages thereof, reference is made to the following description, taken in conjunction with the accompanying drawings, and the scope of the claimed embodiments of the invention will be pointed out in the appended claims.

DETAILED DESCRIPTION

Figure 1:
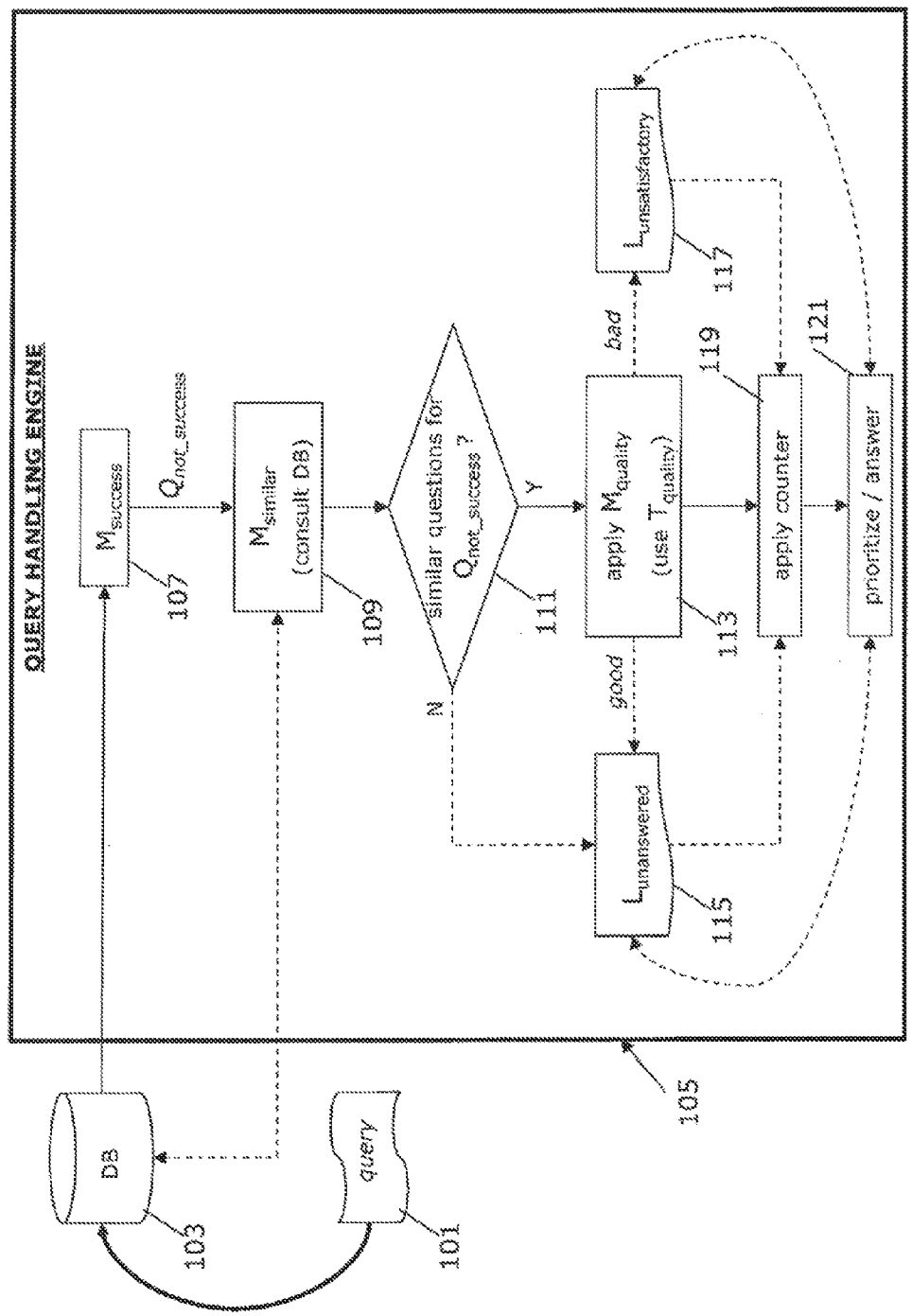
FIG. 1 schematically depicts a query handling engine.

It will be readily understood that the components of the embodiments of the invention, as generally described and illustrated in the figures herein, may be arranged and designed in a wide variety of different configurations in addition to the described exemplary embodiments. Thus, the following more detailed description of the embodiments of the invention, as represented in the figures, is not intended to limit the scope of the embodiments of the invention, as claimed, but is merely representative of exemplary embodiments of the invention.

Reference throughout this specification to "one embodiment" or "an embodiment" (or the like) means that a particular feature, structure, or characteristic described in connection with the embodiment is included in at least one embodiment of the invention. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in at least one embodiment. In the following description, numerous specific details are provided to give a thorough understanding of embodiments of the invention. One skilled in the relevant art may well recognize, however, that embodiments of the invention can be practiced without at least one of the specific details thereof, or can be practiced with other methods, components, materials, et cetera. In other instances, well-known structures, materials, or operations are not shown or described in detail to avoid obscuring aspects of the invention.

The description now turns to the figures. The illustrated embodiments of the invention will be best understood by reference to the figures. The following description is intended only by way of example and simply illustrates certain selected exemplary embodiments of the invention as claimed herein.

It should be noted that the flowchart and block diagrams in the figures illustrate the architecture, functionality, and operation of possible implementations of systems, apparatuses, methods and computer program products according to various embodiments of the invention. In this regard, each block in the flowchart or block diagrams may represent a module, segment, or portion of code, which comprises at least one executable instruction for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Specific reference will now be made herebelow to FIG. 1. It should be appreciated that the processes, arrangements and products broadly illustrated therein can be carried out on, or in accordance with, essentially any suitable computer system or set of computer systems, which may, by way of an illustrative and non-restrictive example, include a system or server such as that indicated at 12' in FIG. 3. In accordance with an example embodiment, most if not all of the process steps, components and outputs discussed with respect to FIG. 1 can be performed or utilized by way of a processing unit or units and system memory such as those indicated, respectively, at 16' and 28' in FIG. 3, whether on a server computer, a client computer, a node computer in a distributed network, or any combination thereof.

Broadly contemplated herein, in accordance with at least one embodiment of the invention, are systems and methods that find unanswered issues or those answered unsatisfactorily, on social media discussions or proprietary call center transcripts/self-help portal logs, etc., and orders them on the basis of an estimated priority. In estimating priority, the system searches discussion sites or proprietary data for reported issues, finds issues that have not been answered yet, or have unsatisfactory answers (thereby leading to more queries or unresolved calls), and gives a ranked list of all issues prioritized by different criteria, so as to maximize the marginal benefit of the authored solutions. The system also assists users in entering or modifying an answer by suggesting different aspects of a "good" answer, which can be domain and/or application specific.

In accordance with at least one embodiment of the invention, arrangements are provided for facilitating the authoring of good content for responding to queries that can also be applied to effective re-use. Particularly, inasmuch as call centers can suffer from problems such as a lack of quality or informativeness in closed tickets, it is recognized as being of immense benefit if a domain-specific system can assist users while authoring content.

FIG. 1 schematically depicts a query handling engine, in accordance with at least one embodiment of the invention. As such, for each instance of querying (101) a knowledge base (or knowledge database [DB]) 103, e.g., a search is performed for a new ticket or customer care call, a query handling engine 105 can employ a method $M_{success}$ (107) which can serve to decide if the activity was a success. For instance, success can be determined if at the end of a search session a new ticket was closed, while a lack of success can be attributed if a call was closed without resolving the attendant issue.

In accordance with at least one embodiment of the invention, for each unsuccessful instance of querying, Q.sub.not.sub.—.sub.success, as decided by M.sub.success, there are found (109) all similar questions already in the knowledgebase using a method M.sub.similar, where M.sub.similar outputs (or determines) the degree of similarity of Q.sub.not.sub.—.sub.success while also outputting (or determining) such existing (similar) questions (111), whereupon those with low degree of similarity are discarded (using a threshold T.sub.similar). Essentially, the threshold T.sub.similar can be considered to be a type of tuning parameter that can freely be adjusted to ensure that very similar questions are chosen and dissimilar ones are discarded. It may be chosen to be dependent on the method M.sub.similar and the range of values output by M.sub.similar. An embodiment of M.sub.similar can employ cosine similarity for text (see, e.g., en.wikipedia.org/wiki/Cosine_similarity) that outputs values from 0 (for least similar text) to 1 (for exactly similar text); for this method, a reasonable T.sub.similar would be 0.8. However, it can readily be up to the discretion of a user or administrator involved to choose an appropriate value.

In accordance with at least one embodiment of the invention, for any and all similar questions, $Q_{similar}$, found in the step just described (and that clear threshold), an answer quality computation method, $M_{quality}$, is used to assign a score to the answer entered (i.e., contained in database 103) for $Q_{similar}$ (113). Here, a threshold, $T_{quality}$, is used to decide if the answer quality is "good" or "bad". If the quality is good, then $Q_{not\_success}$ is solved using some other answer, and is thusly added to a list of unanswered questions, $L_{unanswered}$ (115). In other words, to the extent that a good answer existed in the database, but did not solve the same or similar issue as indeed reported by $Q_{not\_success}$, then $Q_{not\_success}$ is classified as an unanswered question (such that another solution or answer needs to be found in order to solve the same issue). An example would be an access issue where a user is unable to login to a system. An existing answer in the database for this issue could be to reset the user's password. Let it then be assumed, by way of illustration, that this does not solve the user's problem; that is, even after resetting the password, the user is not able to login. After debugging the issue, the system admin might find that the user's internet connectivity is poor and hence not able to reach the system. So, another answer/solution to the same problem would be to ensure internet connectivity. It can thus now be more readily appreciated that a question is added to $L_{unanswered}$ both in a situation where there is no answer but also in a situation where there is an answer of good quality but does not resolve the attendant issue.

In accordance with at least one embodiment of the invention, if answer quality is determined (via threshold) to be bad, then the answer to $Q_{similar}$ ends up being rewritten. Thus, $Q_{similar}$ and/or $Q_{not\_success}$ are then added to a list of unsatisfactorily answered questions, $L_{unsatisfactory}$ (117).

In accordance with at least one embodiment of the invention, if no $Q_{similar}$ is found (at step 1111), then $Q_{not\_success}$ is added to the list of unanswered questions, $L_{unanswered}$ (115). While adding $Q_{not\_success}$ to the lists, $L_{unanswered}$ (115) or $L_{unsatisfactory}$ (117), if similar questions are found to already exist in these lists (as determined by $M_{similar}$ and $T_{similar}$), then there is increased a frequency-of-occurrence counter, $C_{freq}$, corresponding to $Q_{not\_success}$ (119). $C_{freq}$ can be used to later prioritize (121) questions in the $L_{unanswered}$ and $L_{unsatisfactory}$ lists.

In accordance with at least one embodiment of the invention, to estimate a priority of problems for an authoring solution (which then come to be answered) (121), multiple criteria can come into play such as: frequency of occurrence; quality of existing solutions (if any solutions exist); quality of the best solution (if any solutions exist); diversity of problems presented; average time to resolve; estimated savings; and average priority. Suitable methods may be employed to arrive at the estimate, with or without manual input.

As such, in accordance with at least one embodiment of the invention, simply by way of illustrative and non-restrictive example, to measure answer quality a statistical model can be used that is trained on high and low quality answers such that it can distinguish between them for a given new data point. (An illustrative reference, for background purposes, is Majumdar et al., *Privacy protected knowledge management in services with emphasis on quality data, CIKM '11*) To measure a diversity of candidate problems, there can be employed (by way of illustrative and non-restrictive example) a Maximal Marginal Relevance (MMR) criterion. (An illustrative reference, for background purposes, is Carbonell et al., *The Use of MMR, Diversity-Based Reranking for Reordering Documents and Producing Summaries, SIGIR '98*.)

In accordance with at least one embodiment of the invention, by way of illustrative and non-restrictive examples, to measure an average time to resolve (TTR), or the time elapsed from when a problem is reported to the time when it is resolved, such information is usually available in the case of problem ticket data, as entered in a ticketing tool. In the case of social media or online discussions, it can be approximated by the time the question was posted to the time the last post of the discussion is entered. Accordingly, the average of TTRs for all instances of the same problem yields the metric, Average Time To Resolve.

In accordance with at least one embodiment of the invention, by way of illustrative and non-restrictive example, to arrive at estimated savings, the following can be considered. If the best time to resolve the problem at hand across all instances of its occurrence is $T_{best}$, and the Average TTR is $T_{avg}$, where the frequency of the problem is f, then estimated savings is $(T_{avg}-T_{best}) \times (f-1)$.

In accordance with at least one embodiment of the invention, by way of illustrative and non-restrictive examples, average priority can be determined as follows. Essentially, priority of a problem is the urgency with which it has to be resolved. In the case of problem tickets, it is assigned by the customer reporting the problem, and can be obtained from the ticketing tool. In the case of social media or online discussions, it can be inferred from some of the terms or phrases used in discussion, such as "urgent", "immediately", or from terms indicating the impact of the issue such as "crashing", "broken", "unusable" etc. Average Priority then becomes an average of the assessed priority levels of the multiple occurrences of the same problem.

In accordance with at least one embodiment of the invention, by way of illustrative and non-restrictive examples, estimating priority can employ a formula giving different weights to different aspects or contributing criteria, such as criteria discussed hereinabove. The formula could be learned using a statistical model such as RankSVM. (An illustrative reference, for background purposes, is T. Joachims, *Optimizing Search Engines using Clickthrough Data, KDD '02*.] Alternatively, the formula could be user-defined with weights assigned that are deemed to be reasonable or suitable.

In accordance with at least one embodiment of the invention, for an answer that needs to be assisted with (at 121), a method, $M_{struct}$, is employed that can identify/structure the existing content according to the different aspects $A_{g1}$, $A_{g2}$, . . . etc., of the domain dependent template for a good answer. For each of the aspects $A_{gi}$ that is missing in the content, a suggestion is made to the user to add content. For each of the aspects $A_{gi}$ that were identified in the content, a quality computation method, $M_{gi\_quality}$ (and which is specific to $A_{gi}$) is used to assign a score to the content for that aspect. A threshold, $T_{gi\_quality}$, is also used to find those whose quality is not acceptable and report this to the user. These steps are repeated until the*desired quality is attained for each of the aspects.

Figure 2:
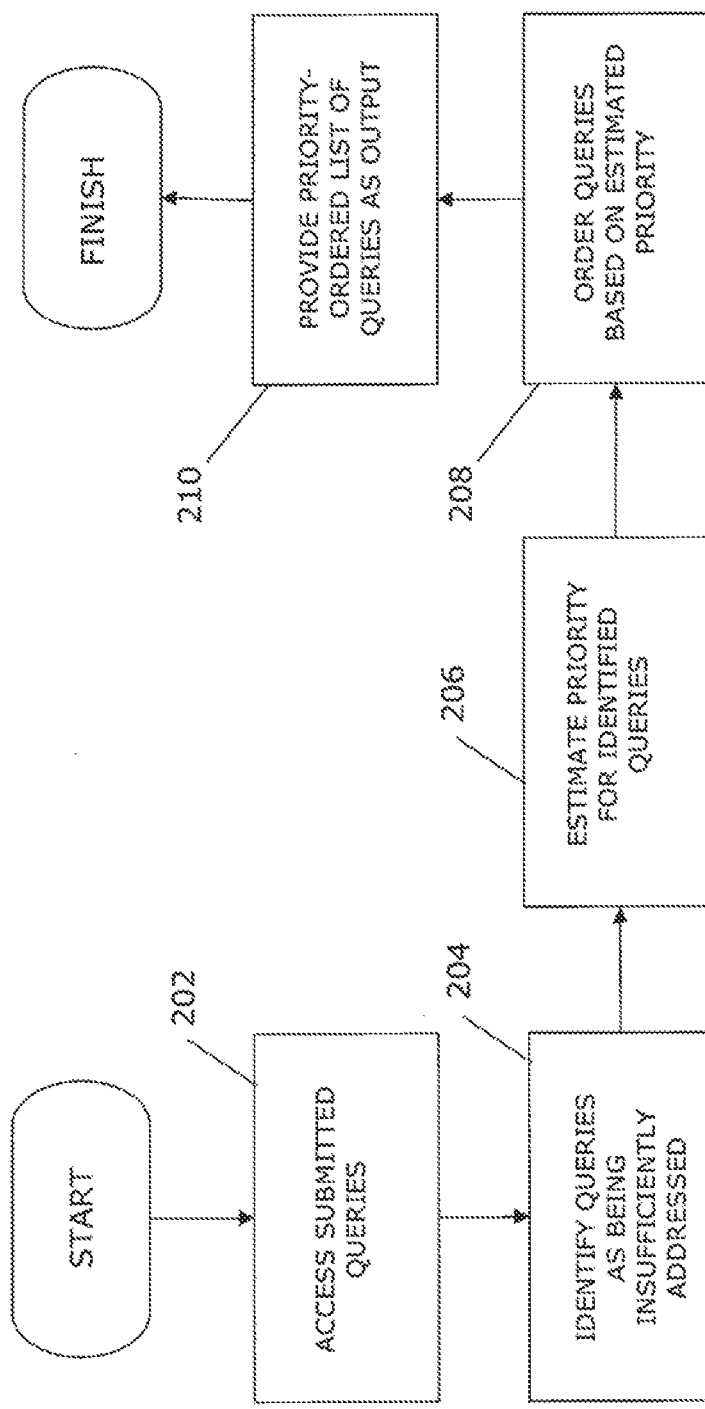
FIG. 2 sets forth a process more generally for assisting with user queries.

FIG. 2 sets forth a process more generally for assisting with user queries, in accordance with at least one embodiment of the invention. It should be appreciated that a process such as that broadly illustrated in FIG. 2 can be carried out on essentially any suitable computer system or set of computer systems, which may, by way of an illustrative and non-restrictive example, include a system such as that indicated at 12' in FIG. 3. In accordance with an example embodiment, most if not all of the process steps discussed with respect to FIG. 2 can be performed by way of a processing unit or units and system memory such as those indicated, respectively, at 16' and 28' in FIG. 3.

As shown in FIG. 2, in accordance with at least one embodiment of the invention, submitted queries are accessed (202), and there are identified queries as being insufficiently addressed (204). A priority is estimated for the identified queries (206), and the identified queries are ordered based on the estimated priority (208). A priority-ordered list of queries is provided as output (210).

Figure 3:
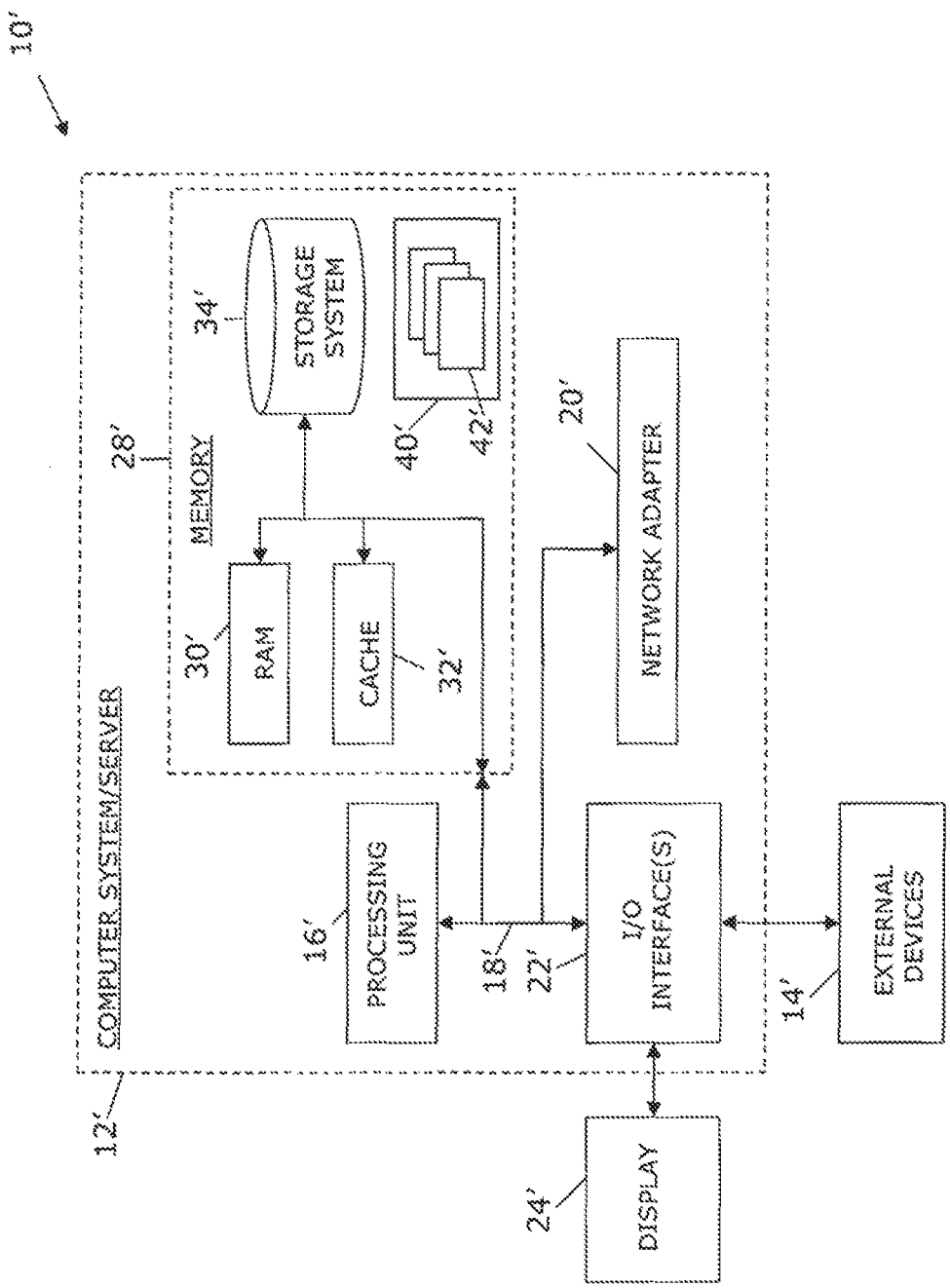
FIG. 3 illustrates a computer system.

Referring now to FIG. 3, a schematic of an example of a cloud computing node is shown. Cloud computing node 10' is only one example of a suitable cloud computing node and is not intended to suggest any limitation as to the scope of use or functionality of embodiments of the invention described herein. Regardless, cloud computing node 10' is capable of being implemented and/or performing any of the functionality set forth hereinabove. In accordance with embodiments of the invention, computing node 10' may not necessarily even be part of a cloud network but instead could be part of another type of distributed or other network, or could represent a stand-alone node. For the purposes of discussion and illustration, however, node 10' is variously referred to herein as a "cloud computing node".

In cloud computing node 10' there is a computer system/server 12', which is operational with numerous other general purpose or special purpose computing system environments or configurations. Examples of well-known computing systems, environments, and/or configurations that may be suitable for use with computer system/server 12' include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12' may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12' may be practiced in distributed cloud computing environments where tasks are performed by remote processing devices that are linked through a communications network. In a distributed cloud computing environment, program modules may be located in both local and remote computer system storage media including memory storage devices.

As shown in FIG. 3, computer system/server 12' in cloud computing node 10 is shown in the form of a general-purpose computing device. The components of computer system/server 12' may include, but are not limited to, at least one processor or processing unit 16', a system memory 28', and a bus 18' that couples various system components including system memory 28' to processor 16'.

Bus 18' represents at least one of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12' typically includes a variety of computer system readable media. Such media may be any available media that are accessible by computer system/server 12', and includes both volatile and non-volatile media, removable and non-removable media.

System memory 28' can include computer system readable media in the form of volatile memory, such as random access memory (RAM) 30' and/or cache memory 32'. Computer system/server 12' may further include other removable/non-removable, volatile/non-volatile computer system storage media. By way of example only, storage system 34' can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18' by at least one data media interface. As will be further depicted and described below, memory 28' may include at least one program product having a set (e.g., at least one) of program modules that are configured to carry out the functions of embodiments of the invention.

Program/utility 40', having a set (at least one) of program modules 42', may be stored in memory 28' (by way of example, and not limitation), as well as an operating system, at least one application program, other program modules, and program data. Each of the operating systems, at least one application program, other program modules, and program data or some combination thereof, may include an implementation of a networking environment. Program modules 42' generally carry out the functions and/or methodologies of embodiments of the invention as described herein.

Computer system/server 12' may also communicate with at least one external device 14' such as a keyboard, a pointing device, a display 24', etc.; at least one device that enables a user to interact with computer system/server 12'; and/or any devices (e.g., network card, modem, etc.) that enable computer system/server 12' to communicate with at least one other computing device. Such communication can occur via I/O interfaces 22'. Still yet, computer system/server 12' can communicate with at least one network such as a local area network (LAN), a general wide area network (WAN), and/or a public network (e.g., the Internet) via network adapter 20'. As depicted, network adapter 20' communicates with the other components of computer system/server 12' via bus 18'. It should be understood that although not shown, other hardware and/or software components could be used in conjunction with computer system/server 12'. Examples include, but are not limited to: microcode, device drivers, redundant processing units, external disk drive arrays, RAID systems, tape drives, and data archival storage systems, etc.

It should be noted that aspects of the invention may be embodied as a system, method or computer program product. Accordingly, aspects of the invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the invention may take the form of a computer program product embodied in at least one computer readable medium having computer readable program code embodied thereon.

Any combination of one or more computer readable media may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having at least one wire, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store, a program for use by, or in connection with, an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire line, optical fiber cable, RF, etc., or any suitable combination of the foregoing.

Computer program code for carrying out operations for aspects of the invention may be written in any combination of at least one programming language, including an object oriented programming language such as Java, Smalltalk, C++ or the like and conventional procedural programming languages, such as the "C" programming language or similar programming languages. The program code may execute entirely on the user's computer (device), partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the invention are described herein with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture. Such an article of manufacture can include instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure.

Although illustrative embodiments of the invention have been described herein with reference to the accompanying drawings, it is to be understood that the embodiments of the invention are not limited to those precise embodiments, and that various other changes and modifications may be affected therein by one skilled in the art without departing from the scope or spirit of the disclosure.

What is claimed is:

1. A method of handling user queries, said method comprising:
   utilizing a processor to execute computer code configured to perform the steps of:
   accessing submitted queries;
   identifying which of the submitted queries are insufficiently addressed;
   estimating a priority for the identified queries by employing a formula that gives different weights to different aspects of a domain dependent template for a good answer;
   ordering the identified queries based on the estimated priority;
   providing a priority-ordered list of queries as output; and
   determining whether a query is similar to at least one other already answered query;
   wherein said determining of whether a query is similar comprises applying a predetermined threshold, the threshold comprising a tuning parameter which can freely be adjusted to ensure that similar questions are chosen and dissimilar questions are discarded;
   upon determining that the query is similar to at least one other already answered query, testing the at least one other already answered query for answer quality; and
   upon testing the at least one other already answered query for answer quality:
      adding the query to a list of unanswered queries if the answer quality of the at least one other already answered query satisfies a predetermined threshold; and
      adding the received query to a list of unsatisfactorily answered queries if the answer quality of the at least one other already answered query does not satisfy a predetermined threshold.

2. The method according to claim 1, wherein the queries are accessed via at least one of: a social media discussion; a call center; and a self-help portal.

3. The method according to claim 1, wherein the queries comprise at least one query not found in a query repository.

4. The method according to claim 1, wherein the queries comprise at least one query for which a satisfactorily answered counterpart is determined to be not available.

5. The method according to claim 1, comprising:
   upon determining that the query is not similar to at least one other already answered query, adding the query to a list of unanswered queries.

6. The method according to claim 1, wherein said estimating comprises estimating based on a frequency with which a problem recurs and on a cost associated with not solving the problem.

7. The method according to claim 1, comprising:
   providing at least one suggested answer to a query;
   wherein said providing of at least one suggested answer to a query comprises considering domain-dependent constituents of an improved answer as identified by a quality computation method which assigns scores.

8. The method according to claim 7, wherein said providing of at least one suggested answer to a query comprises assisting users on entering an acceptable answer via detecting missing constituents and via providing feedback on the quality of each of the constituents via using a statistical model trained on high and low quality answers.

9. The method according to claim 1, wherein the queries comprise unanswered queries and unsatisfactorily answered queries.

10. An apparatus for handling user queries, said apparatus comprising:
   at least one processor; and
   a computer readable storage medium having computer readable program code embodied therewith and executable by the at least one processor, the computer readable program code comprising:
   computer readable program code configured to access submitted queries;
   computer readable program code configured to identify which of the submitted queries are insufficiently addressed;
   computer readable program code configured to estimate a priority for the identified queries by employing a formula that gives different weights to different aspects of a domain dependent template for a good answer;
   computer readable program code configured to order the identified queries based on the estimated priority;
   computer readable program code configured to provide a priority-ordered list of queries as output; and computer readable program code configured to determine whether a query is similar to at least one other already answered query;

wherein to determine whether a query is similar comprises applying a predetermined threshold, the threshold comprising a tuning parameter which can freely be adjusted to ensure that similar questions are chosen and dissimilar questions are discarded;

computer readable program code configured, upon determining that the query is similar to at least one other already answered query, to test the at least one other already answered query for answer quality; and computer readable program code configured, upon testing the at least one other already answered query for answer quality, to:

add the query to a list of unanswered queries if the answer quality of the at least one other already answered query satisfies a predetermined threshold; and add the received query to a list of unsatisfactorily answered queries if the answer quality of the at least one other already answered query does not satisfy a predetermined threshold.

11. A computer program product for handling user queries, said computer program product comprising:

a non-transitory computer readable storage medium having computer readable program code embodied therewith, the computer readable program code comprising:

computer readable program code configured to access submitted queries;

computer readable program code configured to identify which of the submitted queries are insufficiently addressed;

computer readable program code configured to estimate a priority for the identified queries by employing a formula that gives different weights to different aspects of a domain dependent template for a good answer;

computer readable program code configured to order the identified queries based on the estimated priority;

computer readable program code configured to provide a priority-ordered list of queries as output; and computer readable program code configured to determine whether a query is similar to at least one other already answered query;

wherein to determine whether a query is similar comprises applying a predetermined threshold, the threshold comprising a tuning parameter which can freely be adjusted to ensure that similar questions are chosen and dissimilar questions are discarded;

computer readable program code configured, upon determining that the query is similar to at least one other already answered query, to test the at least one other already answered query for answer quality; and computer readable program code configured, upon testing the at least one other already answered query for answer quality, to:

add the query to a list of unanswered queries if the answer quality of the at least one other already answered query satisfies a predetermined threshold; and add the received query to a list of unsatisfactorily answered queries if the answer quality of the at least one other already answered query does not satisfy a predetermined threshold.

12. The computer program product according to claim 11, wherein the queries are accessed via at least one of: a social media discussion; a call center; and a self-help portal.

13. The computer program product according to claim 11, wherein the queries comprise at least one query not found in a query repository.

14. The computer program product according to claim 11, wherein the queries comprise at least one query for which a satisfactorily answered counterpart is determined to be not available.

15. The computer program product according to claim 11, wherein said computer readable program code is configured, upon determining that the query is not similar to at least one other already answered query, to add the query to a list of unanswered queries.

16. The computer program product according to claim 11, wherein said computer readable program code is configured to estimate based on a frequency with which a problem recurs and on a cost associated with not solving the problem.

17. The computer program product according to claim 11, wherein the queries comprise unanswered queries and unsatisfactorily answered queries.

18. A method comprising:

receiving a query;

consulting a query database for an answer to the query;

upon failing to find an answer to the query in the query database, determining whether a similar query exists in the query database; and if a similar query is determined to exist in the query database:

via applying a quality threshold, determining a quality of an existing answer to the similar query;

the quality threshold comprising a tuning parameter which can freely be adjusted to ensure that similar questions are chosen and dissimilar questions are discarded;

classifying the received query based on applying the quality threshold, wherein:

the received query is classified as an unanswered query if the quality threshold is satisfied, and is added to a list of unanswered queries;

the received query is classified as an unsatisfactorily answered query if the quality threshold is not satisfied, and is added to a list of unsatisfactorily answered queries; and thereupon prioritizing the received query for subsequent handling, relative to at least one other received query by employing a formula that gives different weights to different aspects of a domain dependent template for a good answer.

* * * * *